United States Patent
Nitta et al.

(10) Patent No.: US 12,556,069 B2
(45) Date of Patent: Feb. 17, 2026

(54) ROTATING ELECTRICAL MACHINE

(71) Applicant: HITACHI ASTEMO, LTD., Hitachinaka (JP)

(72) Inventors: Takayuki Nitta, Hitachinaka (JP); Yasuyuki Saito, Hitachinaka (JP); Motoo Kitahara, Hitachinaka (JP); Tomoyuki Nakade, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 198 days.

(21) Appl. No.: 18/554,821

(22) PCT Filed: Feb. 2, 2022

(86) PCT No.: PCT/JP2022/004097
§ 371 (c)(1),
(2) Date: Oct. 11, 2023

(87) PCT Pub. No.: WO2022/219890
PCT Pub. Date: Oct. 20, 2022

(65) Prior Publication Data
US 2024/0204623 A1  Jun. 20, 2024

(30) Foreign Application Priority Data
Apr. 13, 2021 (JP) .................. 2021-067429

(51) Int. Cl.
*H02K 11/25* (2016.01)
*B60K 1/00* (2006.01)

(52) U.S. Cl.
CPC ............. *H02K 11/25* (2016.01); *B60K 1/00* (2013.01)

(58) Field of Classification Search
CPC . H02K 3/28; H02K 11/25; H02K 3/50; G01K 1/14; Y02T 10/64; B60K 1/00
USPC .............................................. 310/68 B, 68 C
See application file for complete search history.

(56) References Cited

U.S. PATENT DOCUMENTS

| 2014/0184031 A1 | 7/2014 | Kaneshige |
| 2020/0287435 A1* | 9/2020 | Stauder ................ H02K 3/28 |

FOREIGN PATENT DOCUMENTS

| JP | 2012-178923 A | 9/2012 |
| JP | 2013-51806 A | 3/2013 |
| JP | 2014178258 A * | 9/2014 |

OTHER PUBLICATIONS

Azusazawa et al., Method of Mounting The Sensor Bracket and Sensor Bracket, Sep. 25, 2014, JP 2014178258 (English Machine Translation) (Year: 2014).*
International Search Report with English Translation and Written Opinion dated Apr. 26, 2022 in corresponding International Patent Application No. PCT/JP2022/004097 (8 pages).

* cited by examiner

*Primary Examiner* — Alexander A Singh
(74) *Attorney, Agent, or Firm* — Foley & Lardner LLP

(57) ABSTRACT

A rotating electrical machine includes a coil wound in a distributed square wire manner, a stator core forming a slot that stores the coil, a temperature sensor that detects a temperature of the coil, and a housing that houses the stator core. The temperature sensor includes a support member that supports the temperature sensor by being connected and fixed to the housing, and the support member includes a communication portion communicating with a coil space formed by the stator core and adjacent coils among coils housed in slots.

7 Claims, 8 Drawing Sheets

ROTATING ELECTRICAL MACHINE

TECHNICAL FIELD

The present invention relates to a rotating electrical machine.

BACKGROUND ART

A rotating electrical machine includes a stator core forming a plurality of slots, a coil housed in the slots, and a temperature sensor configured to detect a temperature of the coil. The rotating electrical machine further includes a support member that supports the temperature sensor and has elasticity, and a housing that fixes the support member. The support member of the temperature sensor suppresses the variation in the temperature measurement of the coil, and a method of fixing the temperature sensor has been improved in order to enhance the accuracy of the suppression.

As a background art of the present invention, PTL 1 below discloses a configuration in which a support member includes a body portion of the support member having a fastening bolt hole and a dowel pin insertion hole for fixation to a housing, a spring portion that extends from the body portion of the support member and is an elastic body, and a temperature sensor holding portion that holds a temperature sensor that detects a temperature of a coil provided at a tip of the spring portion. Further, a technique in which the dowel pin hole and a dowel pin of the housing are fitted to each other, and the fastening bolt hole and a bolt hole of the housing are fastened with a bolt, so that the support member can be accurately positioned with respect to the housing is disclosed.

CITATION LIST

Patent Literature

PTL 1: JP 2014-178258 A

SUMMARY OF INVENTION

Technical Problem

However, in the technique of PTL 1, since the support member is attached in consideration of fixing of the housing, there is a problem that the support member is not attached to correspond to the sensor on the coil side, the position accuracy of the detected coil is deteriorated, and the temperature detected by the temperature sensor becomes unstable due to variations in the temperature measurement position. In view of this, an object of the present invention is to provide a rotating electrical machine with improved reliability of a temperature sensor.

Solution to Problem

According to the present invention, a rotating electrical machine includes a coil wound in a distributed square wire manner, a stator core forming a slot that stores the coil, a temperature sensor that detects a temperature of the coil, and a housing that houses the stator core. The temperature sensor includes a support member that supports the temperature sensor by being connected and fixed to the housing, and the support member includes a communication portion communicating with a coil space formed by the stator core and adjacent coils among coils housed in slots.

Advantageous Effects of Invention

According to the present invention, it is possible to provide a rotating electrical machine with improved reliability of a temperature sensor.

Figure 1:
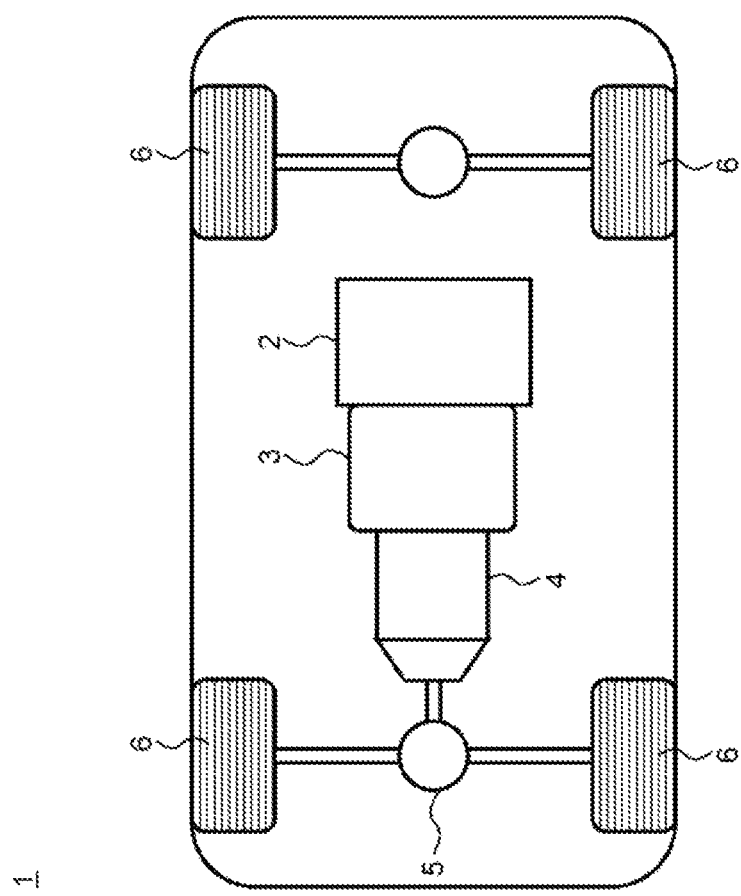
FIG. 1 is a block diagram of a hybrid electric automobile.

Hereinafter, embodiments of the present invention will be described with reference to the drawings. The following description and drawings are examples for describing the present invention, and are omitted and simplified as appropriate for clarity of description. The present invention can be carried out in various other forms. Unless otherwise specified, each component may be singular or plural.

Positions, sizes, shapes, ranges, and the like of the components illustrated in the drawings may not represent actual positions, sizes, shapes, ranges, and the like in order to facilitate understanding of the invention. Therefore, the present invention is not necessarily limited to the positions, sizes, shapes, ranges, and the like illustrated in the drawings.

OVERALL CONFIGURATION OF FIRST EMBODIMENT AND PRESENT INVENTION

FIG. 1 is a block diagram of a hybrid electric automobile equipped with a rotating electrical machine according to the present invention.

An engine 2 and a rotating electrical machine 3 as power sources are mounted on a vehicle 1. Note that the vehicle 1 may be configured such that two rotating electrical machines having different roles are used in combination, one rotating electrical machine performs both power generation and vehicle driving, and the other rotating electrical machine performs vehicle driving.

The rotational torque generated by the engine 2 and the rotating electrical machine 3 is transmitted to wheels (driving wheels) 6 via a transmission 4 such as a continuously variable transmission or a stepped automatic transmission, and a differential gear 5. The rotating electrical machine 3 is mounted between the engine 2 and the transmission 4 or in the transmission 4. In order to meet the demand for miniaturization and high output, the rotating electrical machine 3 is disposed inside the vehicle 1 to minimize an influence of a space on the vehicle 1.

Figure 2:
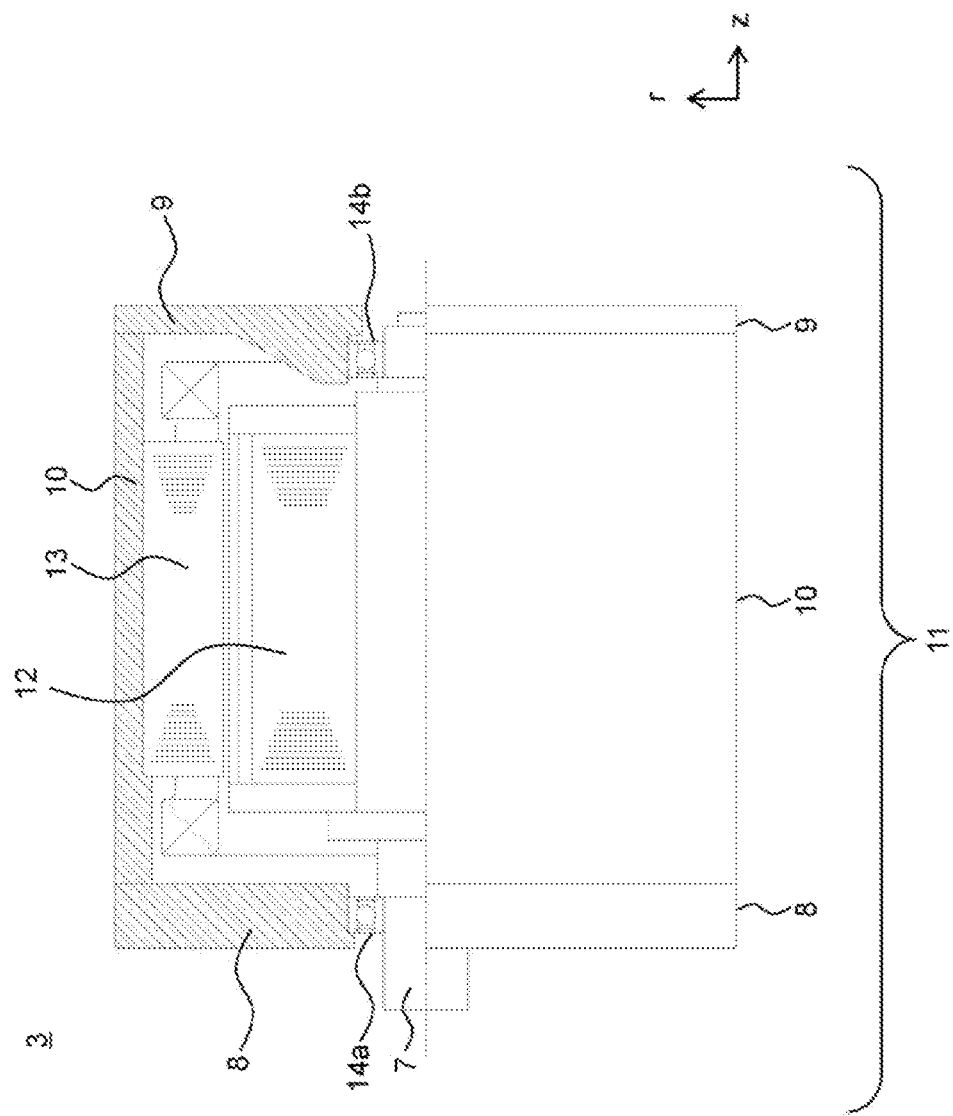
FIG. 2 is a cross-sectional view of a rotating electrical machine.

FIG. 2 is a cross-sectional view schematically illustrating the rotating electrical machine according to the present invention. Note that the upper side is illustrated as a cross-sectional view and the lower side is illustrated as a side view with a shaft 7 interposed therebetween. In addition, an arrow r indicates a rotation direction, and an arrow Z indicates an axial direction. Further, the left side in the drawing is defined as a front side.

The rotating electrical machine 3 is housed and disposed in a case 11 including a front bracket 8, a rear bracket 9, and a housing 10. Note that the case 11 may be configured to be an integrated case 11 including the front bracket 8 and the housing 10, or an integrated case 11 including the rear bracket 9 and the housing 10.

In addition, when the rotating electrical machine 3 is disposed between the engine 2 and the transmission 4 as illustrated in FIG. 1, the case 11 of the rotating electrical machine 3 is configured by using the case of the engine 2 and the case of the transmission 4. Further, when the rotating electrical machine 3 is mounted in the transmission 4, the case 11 is configured by using the case of the transmission 4.

The rotating electrical machine 3 includes a rotor 12 and a stator 13. The outer peripheral side of the stator 13 is fixed to the inner peripheral side of the housing 10. The rotor 12 is disposed on the inner peripheral side of the stator 13 with a gap interposed therebetween. The rotor 12 is fixed to the shaft 7 and rotates integrally with the shaft 7. Both ends of the shaft 7 are rotatably supported by bearings 14a and 14b provided on the front bracket 8 and the rear bracket 9, respectively.

Figure 3:
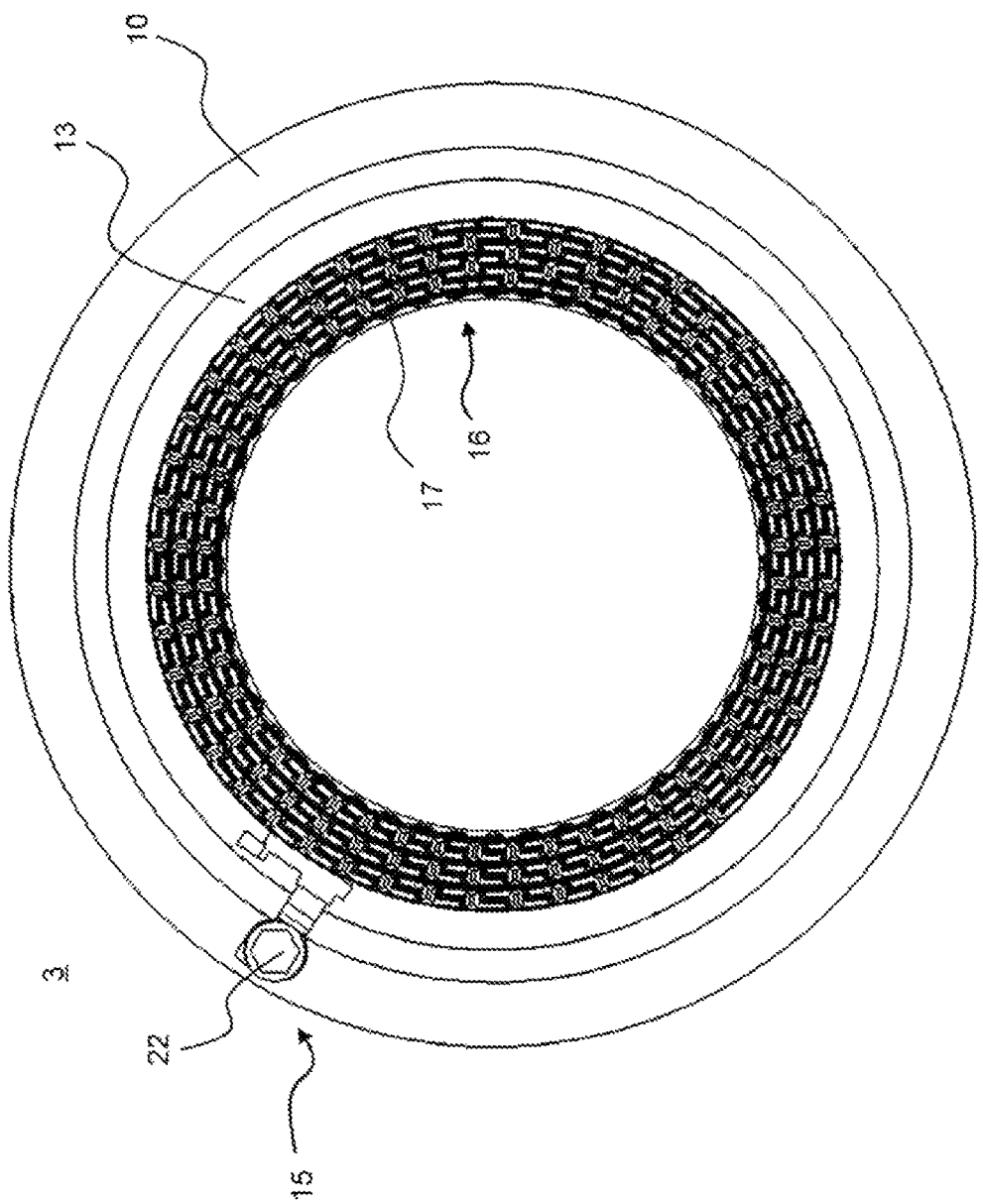
FIG. 3 is a front view of a stator in the rotating electrical machine.

FIG. 3 is a front view of the stator in the rotating electrical machine illustrated in FIG. 2.

In the rotating electrical machine 3, the stator 13 includes a stator core 16 in which a plurality of slots penetrating in the axial direction are arranged at predetermined intervals in a circumferential direction and a coil 17 housed in the slots. A temperature sensor 15 (described later) that extends from the coil 17 in the axial direction (front direction) and detects the temperature of the coil 17 is disposed between the coil 17 protruding from the stator core 16 and the inner wall of the housing 10.

Figure 4:
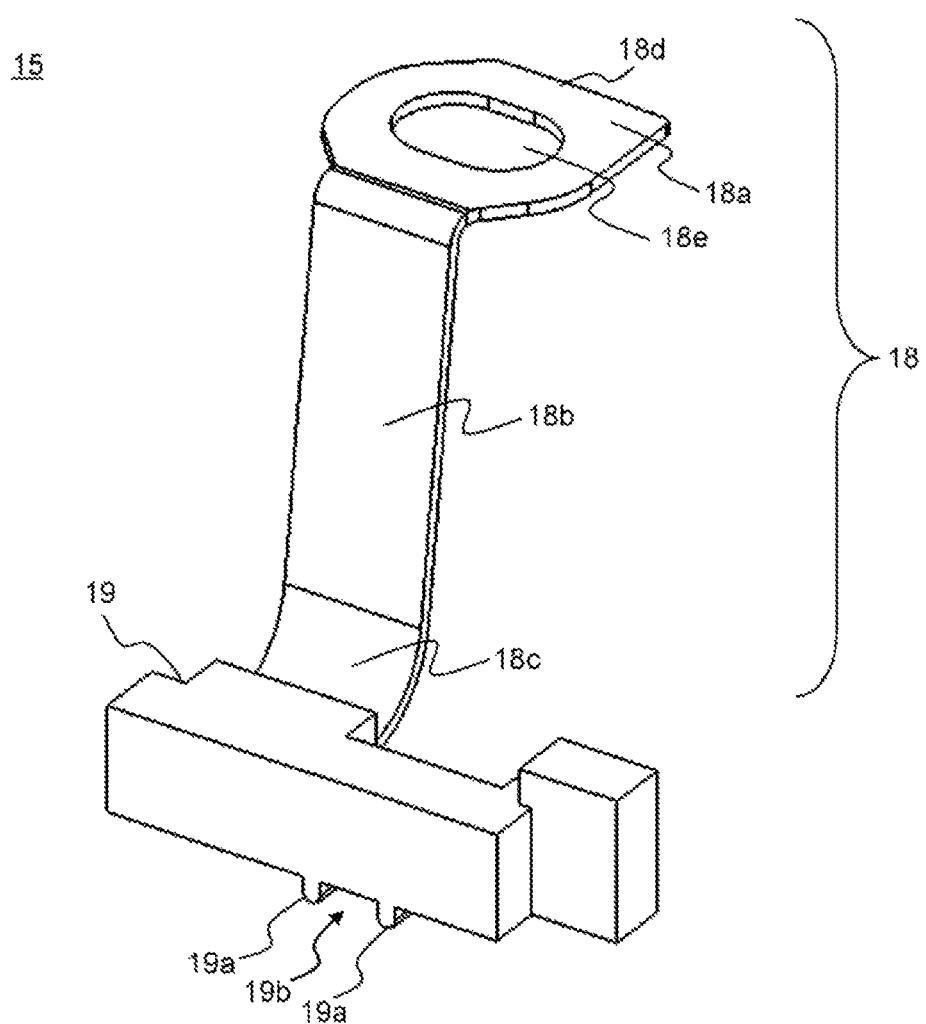
FIG. 4 is an external view of a temperature sensor according to a first embodiment of the present invention.

FIG. 4 is an external view of a temperature sensor according to a first embodiment of the present invention.

A temperature sensor 15 includes a temperature sensor body portion 19, and further includes a support member 18 including a fastening portion 18a, a spring portion 18b, a temperature sensor holding portion 18c. The fastening portion 18a has a hole portion 18e for fastening to the housing 10 (see FIG. 3) with a bolt. The spring portion 18b is an elastic body and extends from the fastening portion 18a to the temperature sensor body portion 19 that detects the temperature of the coil. The temperature sensor holding portion 18c holds the temperature sensor body portion 19 provided at the tip of the spring portion 18b.

The temperature sensor body portion 19 has a communication portion 19b formed from two protrusion portions 19a. The communication portion 19b is formed in a recessed shape by protrusion portions 19a respectively provided at both ends of the communication portion 19b, and the temperature sensor 15 is positioned by such a shape.

When the temperature sensor 15 is fastened and fixed to the housing 10, the hole portion 18e has a shape of a hole of which the circumferential length is larger than the radial length so as to match with the shape of a fixing portion of the housing 10, and thus, the hole portion 18e is an elongated hole having an adjustment margin at the time of fixing.

The fastening portion 18a has an end portion 18d in which a surface in contact with the inner peripheral surface of the housing 10 is formed in a linear shape, as a rotation stopper at the time of fastening and fixing to the housing 10. By fastening the support member 18 to the housing 10 with a bolt, the temperature sensor body portion 19 can be pressed against the coil 17 (see FIG. 3) via the spring portion 18b that is an elastic body. As a result, the temperature sensor 15 can detect the temperature of the coil 17.

Figure 5:
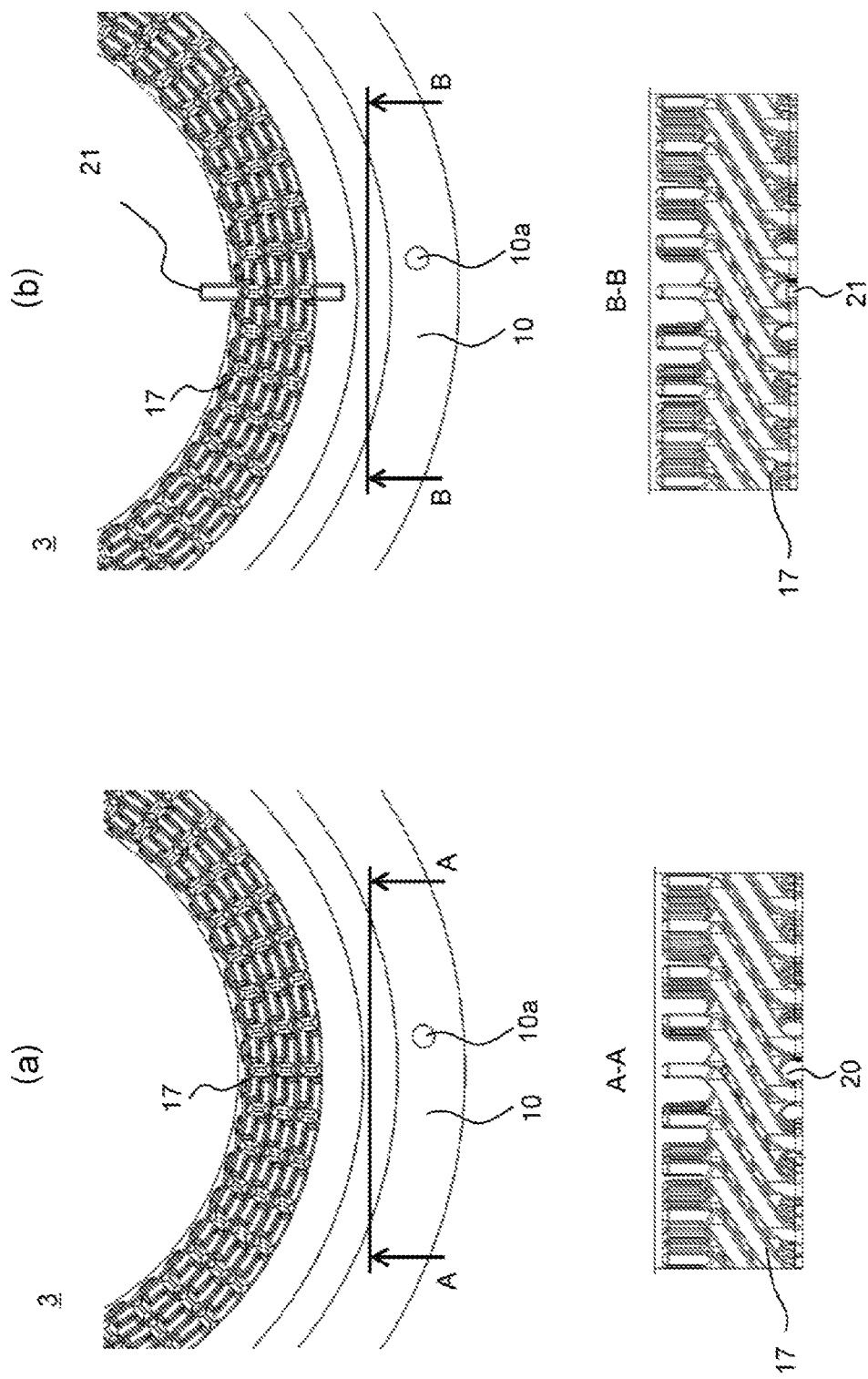
FIG. 5 is an attachment step diagram of a temperature sensor positioning jig according to the first embodiment of the present invention.

FIG. 5 is an attachment step diagram of a temperature sensor positioning jig (hereinafter a positioning jig) according to the first embodiment of the present invention. The lower diagram of FIG. 5(a) illustrates a cross-sectional view by a cut line A-A illustrated in the upper diagram of FIG. 5(a), and the lower diagram of FIG. 5(b) illustrates a cross-sectional view by a cut line B-B illustrated in the upper diagram of FIG. 5(b).

A method of attaching the temperature sensor 15 in the rotating electrical machine 3 will be described. As illustrated in FIGS. 5(a) and 5(b), in a first step, a positioning jig 21 for positioning the temperature sensor 15 is inserted into a coil space 20 formed in an assembly of the coils 17 housed in the slots adjacent in the circumferential direction.

Figure 6:
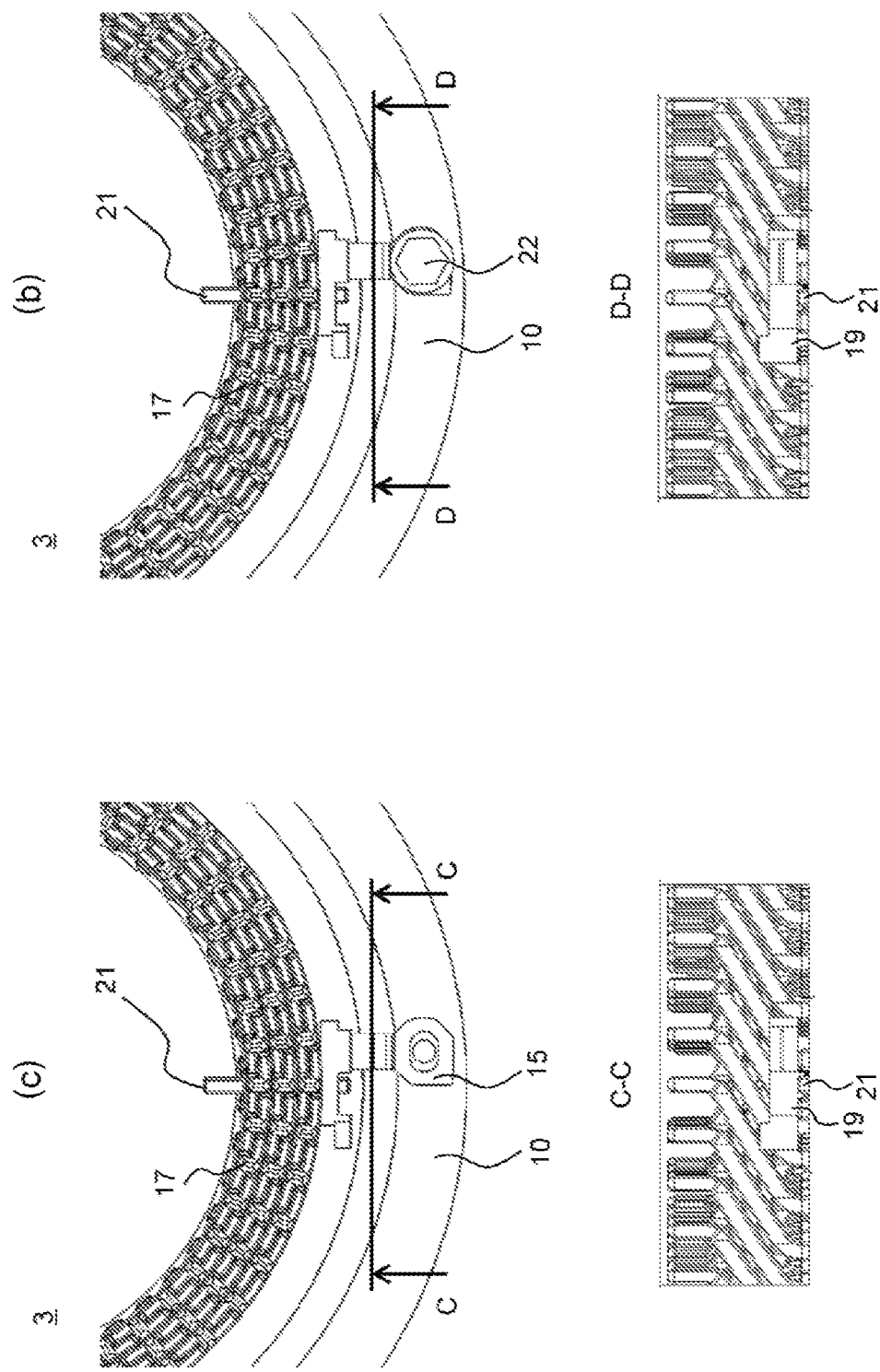
FIG. 6 is an attachment step diagram of a temperature sensor according to the first embodiment of the present invention.

FIG. 6 is an attachment step diagram of the temperature sensor according to the first embodiment of the present invention. The lower diagram of FIG. 6(c) is a cross-sectional view by a cut line C-C illustrated in the upper diagram of FIG. 6(a), and the lower diagram of FIG. 6(b) is a cross-sectional view by a cut line D-D illustrated in the upper diagram of FIG. 6(b).

In a second step, the temperature sensor body portion 19 (FIG. 4) is fitted to the positioned positioning jig 21 via the communication portion 19b (FIG. 4). At this time, the protrusion portions 19a at both ends of the communication portion 19b are prevented from coming into contact with the stator core 16. As a result, the communication portion 19b communicates with the coil space 20 via the positioning jig 21. Then, a fastening bolt 22 is inserted into the hole portion 18e formed in the fastening portion 18a to fasten and fix the temperature sensor 15 and the housing 10 to each other. After the fastening and fixing, the positioning jig 21 is removed. As a result, the temperature sensor 15 is fixed in a state where the temperature sensor 15 is not in contact with the stator core 16.

According to the above attachment method, even if the variation in the position of the coil 17 is large, the temperature sensor 19 is disposed in accordance with the coil 17 by using the positioning jig 21, so that it is possible to perform the positioning with high accuracy.

Figure 7:
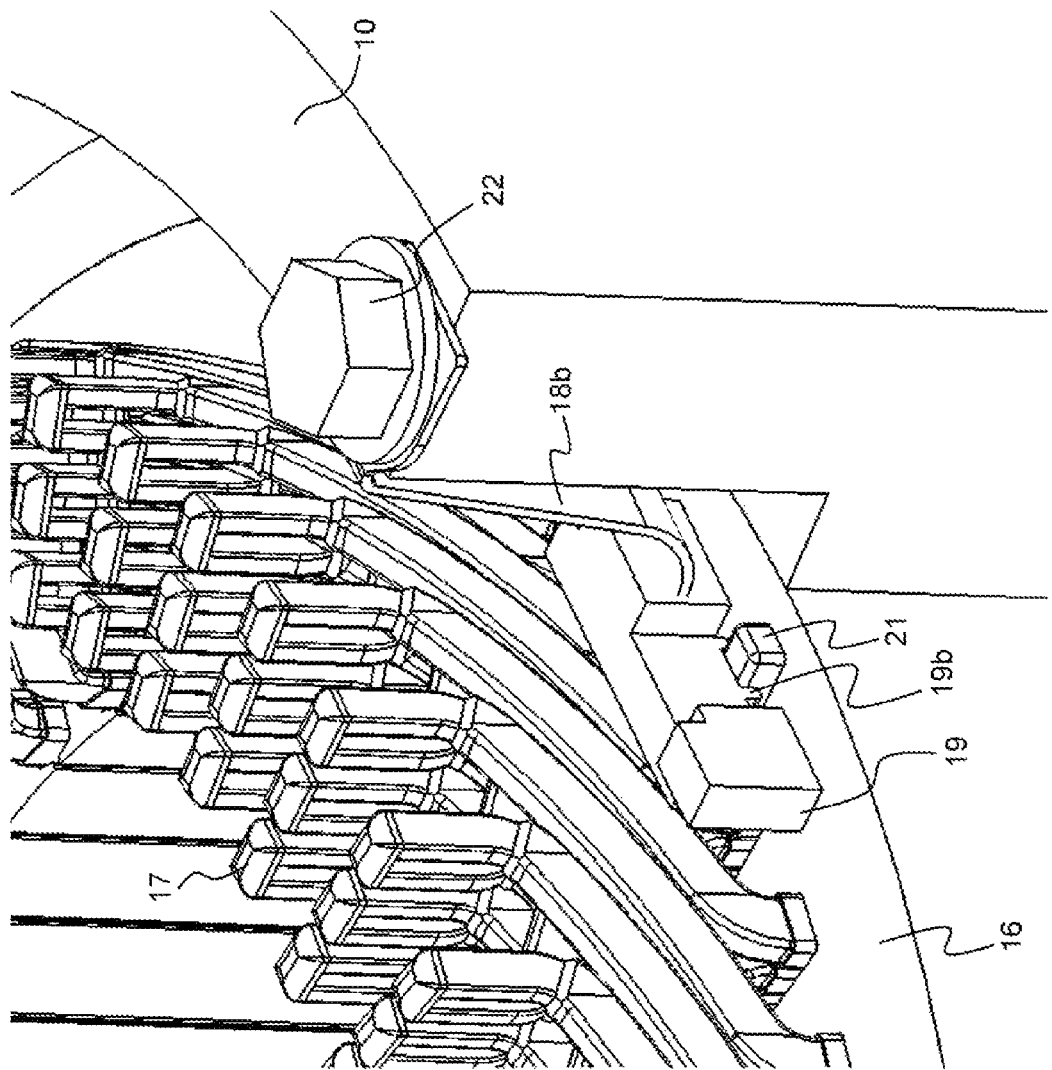
FIG. 7 is an external view of the temperature sensor after attachment according to the first embodiment of the present invention.

FIG. 7 is a view illustrating an external view when the temperature sensor 15 is attached, according to the first embodiment of the present invention, and illustrates a state illustrated in FIG. 6(d).

In the embodiment of the present invention, the coil 17 preferably has a square wire shape. This is because the position of the positioning jig 21 is determined by the surfaces of the coils 17 that come into contact with both sides (side surfaces of the positioning jig 21) when inserted. For example, when the cross section of the coil 17 is circular, the surface of the coil 17 is not a flat surface, and thus the position of the positioning jig 21 becomes unstable. However, if the coil 17 has a square wire shape, the surface of the coil 17 is a flat surface. Thus, the position of the positioning jig 21 becomes stable, and the temperature sensor body portion 19 (temperature sensor 15) can be accurately positioned with respect to the position of the coil 17.

In addition, the protrusion portion 19a (FIG. 4) provided in the temperature sensor body portion 19 is not in contact with the stator core 16 so as not to affect the positioning accuracy of the temperature sensor 15. Thus, the positioning accuracy of the temperature sensor 15 is ensured.

As described above, in the related art, the support member 18 is attached in consideration of fixing to the housing 10 for attachment of the temperature sensor 15. However, as in the present invention, a configuration in which the temperature sensor positioning jig 21 is inserted into the coil space 20 that is a gap between the plurality of coils 17 and the stator core 16 to position the temperature sensor 15, and corresponding to the housing 10 is made by the circumferential fixing margin of the hole portion 18e of the support member 18 of the temperature sensor 15 is adopted. As a result, the rotating electrical machine in which the accuracy of the temperature sensor 15 is improved without changing the fixability of the temperature sensor 15 is obtained.

SECOND EMBODIMENT

Figure 8:
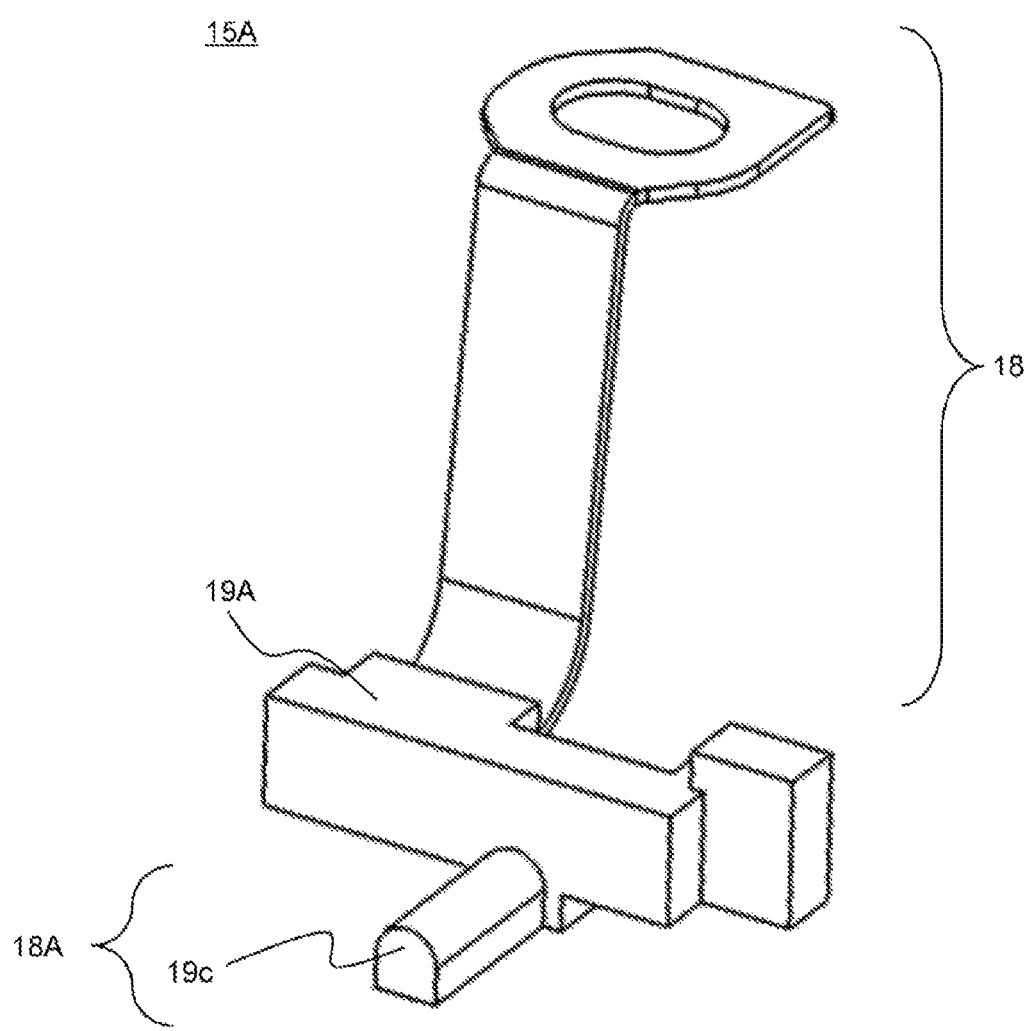
FIG. 8 is an external view of a temperature sensor according to a second embodiment of the present invention.

FIG. 8 is a view illustrating an external view of a temperature sensor 15A according to a second embodiment of the present invention.

In a temperature sensor body portion 19A, the communication portion 19b has a recessed shape (groove) for the positioning jig 21 (see FIG. 7), but for example, a convex portion (protrusion) 19c may be provided in the temperature sensor body portion 19A instead of the communication portion 19b. In this manner, by inserting the convex portion (protrusion) 19c into the coil space 20 (see FIG. 5) formed between the adjacent coils 17 and the stator core 16, positioning can be performed with high accuracy, and the reliability of the temperature sensor 15A is improved.

According to the above-described first and second embodiments of the present invention, the advantageous effects as follows are exhibited.

(1) The rotating electrical machine 3 includes a coil 17 wound in a distributed square wire manner, a stator core 16 forming a slot that stores the coil 17, a temperature sensor 15 that detects a temperature of the coil 17, and a housing 10 that houses the stator core 16. The temperature sensor 15 includes a support member 18 that supports the temperature sensor 15 by being connected and fixed to the housing 10, and the support member 18 includes a communication portion 19b communicating with a coil space 20 formed by the stator core 16 and adjacent coils 17 among the coils 17 housed in the slots. With this configuration, it is possible to provide the rotating electrical machine 3 with improved reliability of the temperature sensor 15.

(2) The communication portion 19b has a recessed shape. With this configuration, it is possible to position the temperature sensor 15 by using the temperature sensor positioning jig 21.

(3) The recessed shape of the communication portion 19b is formed by protrusion portions 19a respectively provided at both ends of the communication portion 19b. With this configuration, it is possible to position the temperature sensor 15 by fitting the positioning jig 21 to the protrusion portions 19a at both ends.

(4) The protrusion portion 19a is not in contact with the stator core 16. With this configuration, it is possible to ensure the fixability of the positioned temperature sensor 15.

(5) The support member 18 includes a fastening portion 18a for fixing the support member 18 to the housing 10 with a bolt 22, the fastening portion 18a has a hole portion 18e through which the bolt 22 is inserted, and the hole portion 18e is formed such that the circumferential length of the rotating electrical machine 3 is larger than the radial length thereof. With this configuration, it is possible to provide a fixing margin with respect to the housing 10.

(6) In the fastening portion 18a, an end portion 18d in contact with the inner peripheral surface of the housing 10 is formed in a linear shape. With such a configuration, it is possible to prevent the rotation of the temperature sensor 15 ensuring the fixability.

(7) The temperature sensor 15 is not in contact with the stator core 16. With this configuration, it is possible to ensure the fixability of the positioned temperature sensor 15.

(8) The rotating electrical machine includes a coil 17 wound in a distributed square wire manner, a stator core 16 forming a slot that stores the coil 17, a temperature sensor 15 that detects a temperature of the coil 17, and a housing 10 that houses the stator core 16. The temperature sensor 15 includes a support member 18 that supports the temperature sensor 15 by being connected and fixed to the housing 10, and the support member 18 includes a convex portion inserted into the coil space 20 formed by the stator core 16 and the adjacent coils 17 among the coils 17 housed in the slots. With this configuration, it is possible to provide the rotating electrical machine 3 with improved reliability of the temperature sensor 15, without using the temperature sensor positioning jig 21.

Note that, the present invention is not limited to the embodiments described above, and includes combinations of various modifications and other configurations in a range without departing from the gist. Further, the present invention is not limited to the one having all the components described in the above-described embodiments, and includes ones in which some of the components are deleted.

REFERENCE SIGNS LIST 1 vehicle
2 engine
3 rotating electrical machine
4 transmission
5 differential gear
6 wheel (driving wheel)
7 shaft
8 front bracket
9 rear bracket
10 housing
10a fastening hole
11 case
12 rotor
13 stator
14a, 14b bearing
15, 15A temperature sensor
16 stator core
17 coil
18, 18A support member
18a fastening portion
18b spring portion
18c temperature sensor holding portion
18d end portion
18e hole portion
19, 19A temperature sensor body portion
19a protrusion portion
19b communication portion
19c convex portion (protrusion)
20 coil space
21 temperature sensor positioning jig
22 fastening bolt

The invention claimed is:

1. A rotating electrical machine comprising:
a coil wound in a distributed square wire manner;
a stator core forming a slot that stores the coil;
a temperature sensor that detects a temperature of the coil; and
a housing that houses the stator core,
wherein;
the temperature sensor includes a support member that supports the temperature sensor by being connected and fixed to the housing, and
the support member includes:
a communication portion communicating with a coil space formed by the stator core and adjacent coils among coils housed in slots, and
a fastening portion for fixing the support member to the housing with a bolt, the fastening portion having a hole portion through which the bolt is inserted, and the hole portion is formed such that a circumferential length of the hole portion is longer than a radial length of the hole portion.

2. The rotating electrical machine according to claim 1, wherein the communication portion has a recessed shape.

3. The rotating electrical machine according to claim 2, wherein the recessed shape of the communication portion is formed by protrusion portions respectively provided at both ends of the communication portion.

4. The rotating electrical machine according to claim 3, wherein each of the protrusion portions is not in contact with the stator core.

5. The rotating electrical machine according to claim 1, wherein, in the fastening portion, an end portion in contact with an inner peripheral surface of the housing is formed in a linear shape.

6. The rotating electrical machine according claim 1, wherein the temperature sensor is not in contact with the stator core.

7. A rotating electrical machine comprising:
a coil in a distributed square wire manner;
a stator core forming a slot that stores the coil;
a temperature sensor that detects a temperature of the coil; and
a housing that houses the stator core,
wherein:
the temperature sensor includes a support member that supports the temperature sensor by being connected and fixed to the housing, and
the support member includes:
a convex portion inserted into a coil space formed by the stator core and adjacent coils among coils housed in slots, and
a fastening portion for fixing the support member to the housing with a bolt, the fastening portion has a hole portion through which the bolt is inserted, and the hole portion is formed such that a circumferential length of the hole portion is longer than a radial length of the hole portion.

* * * * *